United States Patent [19]

McCollister

[11] 4,009,015
[45] Feb. 22, 1977

[54] METHOD OF MAKING GLASS-CERAMICS FROM MODIFIED BASALTS

[75] Inventor: Howard L. McCollister, Toledo, Ohio

[73] Assignee: Owens-Illinois, Inc., Toledo, Ohio

[22] Filed: July 29, 1975

[21] Appl. No.: 600,020

[52] U.S. Cl. .................................. 65/33; 106/39.6
[51] Int. Cl.$^2$ ........................................ C03B 32/00
[58] Field of Search ....................... 65/33; 106/39.6

[56] References Cited

UNITED STATES PATENTS

| | | | |
|---|---|---|---|
| 3,557,575 | 1/1971 | Beal | 65/33 |
| 3,798,014 | 3/1974 | Bondarev et al. | 65/33 |
| 3,819,387 | 6/1974 | Leger et al. | 65/33 |
| 3,901,716 | 8/1975 | Rogers et al. | 65/33 X |
| 3,929,497 | 12/1975 | Clark-Monks | 65/33 X |

OTHER PUBLICATIONS

Voldan; J. "The Melting and Crystallization of Basic Eruptive Rocks," Advances in Glass Technology, The American Ceramic Society, Plenum Press, New York, 1962 pp. 382–395.

Voldan; J. "Monominerale Kristallisation der Schmelzbasalte," Silikat–journal 8 (1969) 7/8.

Voldan; J. "Monominerali Krystalizace Tavehych Cedicu," Veda a Vyzkum v Prumyslu Sklarsem, Sbornik Vyzkumnych Praci v Prumyskem, series IX, pp. 133–156, Prague, 1967.

Voldan; J. "Taveni Cedice s Prisadov Dolomitu" Veda a Vyzkum v Prumyslv Sklarskem, Sbornik Vyzkomnych Praci v Prumyslu Sklarskem, Series X, pp. 126–158 Prague, 1967.

Primary Examiner—Robert L. Lindsay, Jr.
Assistant Examiner—Frank W. Miga
Attorney, Agent, or Firm—Charles S. Lynch; E. J. Holler

[57] ABSTRACT

Disclosed is a method of producing hard glass-ceramics from a melt of basalt enriched with one or more of CaO, MgO and SiO$_2$ to achieve defined ratios of certain oxides in the batch, cooling the melt to a glass and thermally in situ crystallizing the glass to a highly crystalline glass-ceramic product containing a diopside solid solution as the principal phase.

2 Claims, No Drawings

METHOD OF MAKING GLASS-CERAMICS FROM MODIFIED BASALTS

The present invention is an improved method of making a glass-ceramic by melting and recrystalling molten basalt which has been enriched with respect to certain oxides.

Basalt is a dark, typically gray or black, fine-grained volcanic rock. It is the most abundant fine-grained igneous rock. occurring in thicknesses up to several thousand feet and covering surfaces of thousands of square miles in some areas. Large quantities are available in the western United States, mainly in Washington and Oregon, in the Upper Peninsula of Michigan, New Jersey, Colorado and Hawaii. Millions of tons of basaltic ore are available in Upper Michigan in the form of tailings from about 100 years of copper ore mining and beneficiation.

For many decades, especially in Germany, France, Czechoslovakia, and more recently Russia, basalt has been melted and cast into useful shapes, which are allowed to cool slowly enough to allow crystallization during cooling. In general this method of crystallization allows formation of relatively large crystals and can result in the formation of voids and of cracks.

However, in 1928 Albert Portevin published his work on formation of cast shapes from basalt.[1] There he recommends forming a completely vitreous object from molten basalt and thereafter devitrifying the vitreous article during reheating, noting that a much finer texture results when crystalling on reheating rather than cooling from the melt. The Portevin article illustrates many industrial articles made from the "reconstituted" basalt, and describes their advantageous mechanical, chemical and electrical properties.

[1]*The Molten Basalt*, Mem. Soc. Ing. Civils France 266–300 (1928).

Bela Locsei in an article entitled "Composition of Molten Silicate Construction Materials"[2] suggests the recrystallization of nearly entirely glassy material cast from a molten basalt. However, he suggests that the $SiO_2$ content of basalt is not high enough to produce the best products by this technology.

[2]Locsei, Bela, Magyar Kem. Lapja, 9, 294–8 (1954)

It is an object of the present invention to provide a reliable method of making a glass-ceramic that is highly crystalline, finely textured and hard, employing basalt as the principal raw material.

I have now discovered that valuable glass-ceramics can be made by thermal in situ crystallization of glasses made from natural basalt with additions of one or more of CaO or MgO or $SiO_2$. The glass-ceramics so made are fine-grained, essentially non-porous, abrasion resistant and hard, as exhibited by their excellent Knoop micro hardness values. These glass-ceramics made from the modified basalt glasses have a volume percent crystallinity of over 85 percent and have as main crystalline phases a diopside solid solution phase and a significant but minor acmite phase, and less than 15 volume percent glassy phase.

It has been found that the foregoing crystalline structure, including the highly crystalline character of the basalt glass-ceramic is accomplished by adding to the raw material basalt batch material an amount of one or more of CaO, MgO and $SiO_2$ (including precursors thereof) to produce in the composite batch material the following ratios

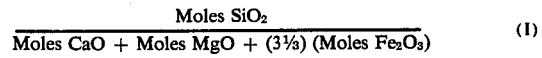

in the range of 0.9 to 1.1, preferably 0.95 to 1.05

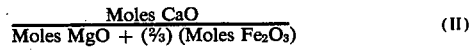

in the range of 0.9 to 1.1, preferably 0.95 to 1.05 wherein "Moles $Fe_2O_3$" represents the total iron oxide content of the raw material batch, expressed as $Fe_2O_3$.

It is believed that most of the alumina is present in the diopside solid solution phase in one form or another, and that a large portion of the $Na_2O$ and the $Fe^{3+}$ is present in an acmite phase. In any event, the products of the invention contain a diopside solid solution phase as the major phase and an acmite phase as a minor crystalline phase and less than fifteen volume percent amorphous or glassy phase. The products are further characterized by a fine crystalline structure, essentially all crystals being less than 5 microns across in their largest lineal dimension.

The basalt glass-ceramic products of the method of the invention are further characterized in having a high Knoop micro hardness of at least 800.

The method of the invention comprises (1) melting, under essentially non-reducing furnace conditions, a basalt together with additions of one or more of CaO, MgO and $SiO_2$ to adjust the molar ratios as indicated above, (2) cooling the melt to form an essentially homogeneous and essentially entirely vitreous solidified glass and (3) reheating the glass and thereby effecting its thermal in situ crystallization.

It has been surprisingly found that essentially no magnetite crystals are present in the modified basalt glass-ceramics made according to the invention. In U.S. Pat. No. 3,557,575, directed to producing glass-ceramics by heat treating glasses made from molten basalt, magnetite is always the first crystal phase to appear. In fact, such magnetite crystals are indicated in column 7 to be necessary for the nucleation and subsequent crystallization of the modified basalt glasses to form the main phase pyroxene crystals.

Furthermore, Voldan[3] is to much the same effect, i.e., pyroxene crystals are grown on magnetite centers when a quenched basalt glass is reheated to effect controlled crystallization.

[3]Voldan, J: "The Melting and Crystallization of Basic Eruptive Rocks," Advances in Glass Technology, The American Ceramic Society, Plenum Press, New York, 1962, pp. 382-95.

According to my invention I have found that the specified ratios insure that very little glass is left in the glass-ceramic. I have also found that acmite is formed in a minor amount and I theorize that acmite may be responsible for the initiation of many crystal sites to nucleate the diopside solid solution phase so that very small, randomly oriented crystals are obtained.

The determination of a suitable heat treatment schedule to obtain the desired glass-ceramic products according to the invention is in accordance with the following principles.

As is well known, the art of controlled thermal crystallization of a glass to a glass-ceramic involves an initial step of heating in a temperature range where the rate of nuclei or crystallite formation is high relative to the rate of crystal growth, where "nuclei" are defined as submicroscopic precursors of crystalline species or, in some instances, as a finely dispersed submicroscopic immiscible glassy phase. It is difficult to measure directly the area or range of temperatures in which a maximum examination, of nuclei formation occurs, or in other words where the optimum temperature range for the initial heat treatment is to be located. However, this temperature usually lies in the range from the annealing point of the glass to about 250° F above the annealing point of the glass.

While this maximum rate of nuclei formation temperature range is difficult to measure directly, the optimum initial heat treatment temperature can be empirically determined employing small droplets of the glass and a micro-furnace capable of very rapid temperature change and accurate temperature control. A droplet of the glass that has been cooled to below the annealing point temperature, can be rapidly heated in the micro-furnace to a specific temperature between the annealing point and 200° or 250° F. above the annealing point, and held at such temperature for a specified time interval, the length of time of heating depending, again, upon the particular glass. Thus, if the glass inherently very rapidly forms nuclei, a shorter standard time at the low temperature can be used than if the nuclei are relatively only slowly formed. In any case, as an example, a droplet of the glass can be heated for 15 minutes at 40° F. above the annealing point temperature. Thereafter the droplet of glass in the micro-furnace is very rapidly heated to a predetermined crystallization temperature within the range, say, from 1500°–1650° F. and held at such predetermined temperature for a specific length of time, for instance, one-half hour. This process can be repeated, using the same length of time of initial and final heating and the same temperature of final heating, but using different initial heating temperatures, say 30°, 50°, 60°, 70°, and 80° F. above the annealing point temperature. Thereafter by microscopic examintion, one can determine which initial heat treatments resulted in formation of the most and finest crystals, and thus determine the range of temperatures where maximum number of crystallization centers are formed. Since the crystals are often extremely small, the microscopic examination may necessarily be electron microscopic examination of etched surfaces using replication techniques.

The crystallization may be effected by holding at an initial nucleation temperature for a definite time, say ½ to 20 hours, and then heating up to one or more higher plateaus for long enough to effect crystallization to a product of over 85 volume percent crystalline material, say for a time of 15 minutes to 10 hours or more. On the other hand, the nucleation may be effected by heating up slowly through a suitable nucleation range and on up to and through a suitable crystallization range slowly enough to effect the prescribed degree of crystallization.

Furthermore, the nucleation temperature and the crystallization temperature can be identical because holding the glass for a very long time, be it 50 or 1000 hours, at the nucleation temperature will almost always result in crystallization, especially if the nucleation temperature chosen is not the minimum temperature at which nucleation can be effected. However, this method is seldom followed because of the added expense of processing.

In any event, it has been found that the highest temperature of crystallization usually should not exceed about 1050° C, but is more preferably not over 950° C, especially when particularly small crystals are desired.

In accordance with the foregoing discussion, those skilled in the art will understand that no specific nucleation temperature or temperature range can be specified in numbers, since the best nucleation and crystallization temperature range will vary somewhat in accordance with the specific composition being studied.

The heat treatment schedule chosen in accordance with the foregoing principles results in a multitude of very small (less than 5 microns) randomly oriented, essentially homogeneously dispersed crystals and a product that is over 85 volume percent crystalline.

The melting temperature for the composite batch material is generally in the range from about 1300° C to about 1600° C., but in any event is sufficiently high to effect complete melting. It is usually preferred to employ a melting temperature in the lower part of this range where possible.

In general the glass-ceramics of the invention can be formed as tiles or other articles where abrasion resistance is useful, in fact, for the same uses as cast and recrystallized basalt has been used, such as paving tiles, building tiles, tiles for lining process equipment such as cyclone separators. The glass melt can be cast as pipe by centrifugal casting and thereafter crystallized to the glass-ceramic, and such pipe is useful in conveying air dispersions or liquid slurrys of abrasive solids.

The products made according to the present invention are more abrasion resistant and more uniform than ordinary cast basalt articles of commerce.

The following examples are for illustrative purposes only and are not to be interpreted as limiting the invention as otherwise described herein. Example I at present represents the best mode known to me for carrying out the present invention.

EXAMPLE I

In a specific example of the invention a Michigan basalt of the following composition on a dry and $CO_2$-free basis

|  | Weight Percent | Mole Percent |
|---|---|---|
| $SiO_2$ | 49.0 | 53.8 |
| $Al_2O_3$ | 15.8 | 10.2 |
| CaO | 10.8 | 12.7 |
| $Fe_2O_3$ | 6.7 | 2.8 |
| FeO | 5.2 | 4.8 |
| MgO | 5.3 | 8.7 |
| $Na_2O$ | 4.1 | 4.4 |
| $K_2O$ | 1.0 | 1.1 |
| $TiO_2$ | 2.0 | 1.7 |
| $P_2O_5$ | 0.1 | Tr. | was ground to −16 mesh and blended with reagent grade $CaCO_3$ and MgO, in the proportions of 90 parts by weight of basalt, 10.33 parts by weight $CaCO_3$ and 4.2 parts by weight of MgO to give a batch composition, with all of the iron oxide expressed as $Fe_2O_3$ and on a $CO_2$ free basis, as follows:

|  | Mole Parts |
|---|---|
| $SiO_2$ | 46.8 |
| $Al_2O_3$ | 8.9 |
| CaO | 17.8 |
| $Fe_2O_3$ | 4.5 |
| MgO | 14.2 |
| $Na_2O$ | 3.8 |

| | Mole Parts |
|---|---|
| $K_2O$ | 0.6 |
| $TiO_2$ | 1.4 |
| $P_2O_5$ | Tr. |

The batch was melted in a gas fired furnace under slightly oxidizing conditions of 1% excess $O_2$, with stirring, for a period of four hours using a melting temperature of 1510° C.

Several 4 × 4 × ⅜inch slabs were cast and the castings cooled to glass. The liquidus of the glass was about 1220°C and its coefficient of thermal expansion was 68.5 ×10⁻⁷/° C over the range from zero to 300° C. and its density was determined to be 2.8715 grams per cc.

Slabs of the glass were crystallized by heating to 650° C and holding there for 1 hour, heating 5° C/min. to 850° C and holding there for 1½ hour, then slowly cooling to ambient temperature. Another suitable heat treatment was found to be 650° C for 1 hour, heating at 3° C/min. to 900° C and then slowly cooling.

The crystallized glass was examined by X-ray powder diffraction using a Guiner-de Wolff camera and found to contain diopside solid solution as the major phase plus a minor acmite phase. Electronmicrograph studies showed that the glass-ceramic was about 95 volume percent crystals of less than 1 micron in diameter with very little residual glassy phase. X-ray powder diffraction studies showed that essentially no magnetite was present.

The density was 3.1279 grams per cc. and the coefficent of thermal expansion was 81 × 10⁻⁷/° C over the range zero to 300° C.

Knoop micro hardness values were obtained using a Wilson Tukon hardness tester with a specimen load of 100 grams. The grinding abrasion weight loss per unit area was determined by mounting four specimens in casting resin with an exposed specimen surface area of 78.5 mm²±1.0, and weighing the sample before and after grinding abrasion. The abrasion test consists of two samples mechanically rotated against water lubricated 120 grit SiC paper using a sample load of 137.5 grams, a wheel speed of 550 rpm, and a 15 minute abrasion time. Both samples traverse identical regions of the SiC paper. A standard was used in each test. Ten tests with this standard resulted in a standard deviation of $\sigma$ = 0.00173 grams weight loss/78.5 mm² or about 10% deviation between the tests.

The abrasion loss for this area was 0.0220 grams. The Knoop micro hardness was an excellent 863. The ratio of formula I was 0.995 and of formula II was 1.03.

A commercial cast, recrystallized basalt, called Abresist, made in Germany and marketed in this country by the M. H. Detrick Co., Chicago, Ill. was tested in the same manner for abrasion loss and Knoop micro hardness; the values were 0.03735 grams loss and 707 Knoop micro hardness. The composition of Abresist was found to be

| | Weight Percent |
|---|---|
| $SiO_2$ | 46.1 |
| $Al_2O_3$ | 14.2 |
| $Fe_2O_3$ | 3.2 |
| $FeO$ | 7.6 |
| $TiO_2$ | 2.5 |
| $CaO$ | 11.0 |
| $MgO$ | 10.6 |
| $Na_2O$ | 3.0 |
| $K_2O$ | 1.5 |

When converted to mole parts it was determined that the ratio of formula I was 1.1 and the ratio of formula II was 0.63.

EXAMPLE II

Example I was repeated but using the Michigan basalt with no additions. The resulting glass-ceramic was about 60 percent crystalline and about 40 percent glass. Its abrasion weight loss was 0.0245 grams and its Knoop Micro Hardness was 639. The ratio of formula I was 1.26 and the ratio of formula II was 1.04.

EXAMPLES III & IV

Similar results to yield products having the characteristics of the invention are obtained when Example I is repeated using a Colorado basalt and a New Jersey basalt properly adjusted by additions of CaO and MgO. The two basalts have the following compositions, where the iron oxide is expressed as $Fe_2O_3$.

| | Colorado Mole Parts | New Jersey Mole Parts |
|---|---|---|
| $SiO_2$ | 55.1 | 54.80 |
| $Al_2O_3$ | 11.8 | 8.94 |
| $CaO$ | 9.8 | 11.37 |
| $Fe_2O_3$ | 4 | 4.35 |
| $MgO$ | 9.5 | 12.51 |
| $Na_2O$ | 3.2 | 4.86 |
| $K_2O$ | 2.7 | .32 |
| $TiO_2$ | 0.7 | 1.02 |
| $P_2O_5$ | 0.4 | — |

Additions of CaO and MgO are made to each of these basalts to yield compositions as follows:

| | Colorado Mole Parts | New Jersey Mole Parts |
|---|---|---|
| $SiO_2$ | 55.1 | 54.80 |
| $Al_2O_3$ | 11.8 | 8.94 |
| $CaO$ | 22.4 | 22.7 |
| $Fe_2O_3$ | 4 | 4.35 |
| $MgO$ | 19.2 | 18.7 |
| $Na_2O$ | 3.2 | 4.86 |
| $K_2O$ | 2.7 | 0.32 |
| $TiO_2$ | 0.7 | 1.02 |
| $P_2O_5$ | 0.4 | — |
| Ratio I | 1 | 0.98 |
| Ratio II | 1.02 | 1.05 |

EXAMPLE V

When a basalt of the following composition, on a dry and $CO_2$-free basis, with the iron oxide expressed as $Fe_2O_3$, is used

| | Mole Parts |
|---|---|
| $SiO_2$ | 46.9 |
| $Al_2O_3$ | 6.3 |
| $CaO$ | 13.2 |
| $Fe_2O_3$ | 5.7 |
| $MgO$ | 18.7 |
| $Na_2O$ | 2.3 |

-continued

|       | Mole Parts |
|-------|------------|
| $K_2O$  | 0.8 |
| $TiO_2$ | 2.9 |
| $P_2O_5$| 0.3 | the addition of $SiO_2$ is required, as is CaO, but no MgO is necessary to satisfy formulas I and II to obtain the desired crystallized product according to the invention. Thus, the initial ratio $$\frac{\text{Moles CaO}}{\text{Moles MgO} + \tfrac{2}{3}\text{ Moles Fe}_2\text{O}_3} = 0.586$$

requires the addition of 9.3 mole parts of CaO to bring this ratio to 1, and the ratio $$\frac{\text{Moles SiO}_2}{\text{Moles CaO} + \text{Moles MgO} + (3\tfrac{1}{3})\text{ Moles Fe}_2\text{O}_3}$$

with the added CaO is 46.9/61.2, or 0.767, so that 14.3 mole parts of $SiO_2$ are also added to bring this ratio to 1, resulting in a final mole percent composition with iron oxide expressed as $Fe_2O_3$, as follows:

| $SiO_2$   | 50.7 |
| $Al_2O_3$ | 5.2  |
| CaO       | 18.7 |
| $Fe_2O_3$ | 4.7  |
| MgO       | 15.5 |
| $Na_2O$   | 1.9  |
| $K_2O$    | 0.7  |
| $TiO_2$   | 2.4  |
| $P_2O_5$  | 0.2  |

EXAMPLE VI

In this example a synthetic batch was made up similar to a basalt in oxide percentages, except that it had no $Na_2O$ (except for batch impurities). This composition was as follows, with all iron expressed as $Fe_2O_3$:

|         | Mole Parts |
|---------|------------|
| $SiO_2$   | 48.95 |
| $Al_2O_3$ | 7.31  |
| CaO       | 11.21 |
| $Fe_2O_3$ | 4.99  |
| MgO       | 23.23 |
| $Na_2O$   | 0.06  |
| $K_2O$    | Tr.   |
| $TiO_2$   | 1.86  |
| $P_2O_5$  | 0.19  |

The batch was melted for 6.5 hours at a temperature of about 1350° C with stirring for about 4.75 hours. Slabs were cast and cooled to a glass and thereafter heat treated. Two heat treatments were used, as follows:

Sample 1
  87° C/hr. to 677° C
  677°C - 1½ hrs.
  11° C/hr. to 850° C
  1.7° C/hr. to 816° C
  5.2° C/hr. to 500° C
  Cool at furnace rate Sample 2
  86° C/hr. to 750° C
  750° C - 1 hr.
  9° C/hr. to 871° C
  4.5° C/hr. to 810° C
  33° C/hr. to 500° C
  Cool at furnace rate Both samples were only about fifty percent crystalline, mainly diopside solid solution. Heat treatment 1 gave 25–30 micron crystals and heat treatment 2 gave 50–60 diameter crystals. Since there was no $Na_2O$ present, no acmite was present, which perhaps explains the very large crystal sizes.

EXAMPLE VII

In this example the same basalt was used as in Example I, but twice as much CaO and twice as much MgO were added as were added in that example. The same melting temperature and conditions were used. The batch composition is given below with iron oxide being expressed as $Fe_2O_3$

|           | Mole Parts |
|-----------|------------|
| $SiO_2$   | 40.2 |
| $Al_2O_3$ | 7.6  |
| CaO       | 21.8 |
| $Fe_2O_3$ | 3.8  |
| MgO       | 19.9 |
| $Na_2O$   | 3.3  |
| $K_2O$    | 0.5  |
| $TiO_2$   | 1.2  |
| $P_2O_5$  | Tr.  |

The ratio according to formula I was 0.74 and the ratio according to formula II was 0.97. Several attempts were made to crystallize the glass resulting from melting and casting this batch. This was accomplished, but crystals of over 50 microns were always obtained. The crystallization was effected as follows:

| Sample No. | Heat Treatment |
|------------|----------------|
| 1 | 750° C-16 hrs. |
| 2 | 650° C-16 hrs. |
| 3 | 1050° C-16 hrs. |
| 4 | 750° C-1 hr.; 900° C-16 hrs. |

As stated, all contained large sized crystals. Sample 1 was only about 40 volume percent crystalline and the crystals were diopside. Sample 3 had forsterite crystals as the main crystals plus some diopside, while sample 4 contained diopside and forsterite in about equal amounts. None of the samples contained any acmite, which may account for the inability to form small crystals.

As will be evident to those skilled in the art, modification of this invention can be made or followed in the light of the foregoing disclosure without departing from the spirit and scope of the disclosure or from the scope of the claims.

I claim:

1. The method of making a glass-ceramic having a Knoop micro hardness of at least 800, over 85 volume percent crystallinity, containing a multitude of randomly oriented, essentially homogeneously dispersed crystals, essentially all of which are less then 5 microns across in their largest lineal dimension, which comprises 1. melting under essentially non-reducing conditions a batch consisting essentially of basalt and one or more oxide (or precursor thereof) selected from CaO, MgO and SiO$_2$, the selection of such oxide(s) and amounts thereof being effective to result in an overall composition having the following two ratios in the indicated ranges:

$$\frac{\text{Moles SiO}_2}{\text{Moles CaO} + \text{Moles MgO} + (3\frac{1}{3})(\text{Moles Fe}_2\text{O}_3)} \quad \text{(I)}$$

in the range of 0.9 to 1.1, and $$\frac{\text{Moles CaO}}{\text{Moles MgO} + (\frac{2}{3})(\text{Moles Fe}_2\text{O}_3)} \quad \text{(II)}$$

in the range of 0.9 to 1.1
wherein the "Moles Fe$_2$O$_3$" represents the entire iron oxide content of the batch expressed as Fe$_2$O$_3$, including the actual Fe$_2$O$_3$ as well as the FeO present in the basalt, 2. cooling the melt to form an essentially homogeneous and essentially entirely vitreous solidified glass and 3. heating said glass according to a time and temperature schedule effective to crystallize same to said glass-ceramic having essentially no magnetite crystals and having the ratios (I) and (II) above.

2. The process of claim 1 where the ratio according to (I) is in the range from 0.95 to 1.05 and the ratio according to (II) is in the range from 0.95 to 1.05.

* * * * *